No. 888,078. PATENTED MAY 19, 1908.
L. E. FULLER.
CLUTCH.
APPLICATION FILED JUNE 13, 1907.
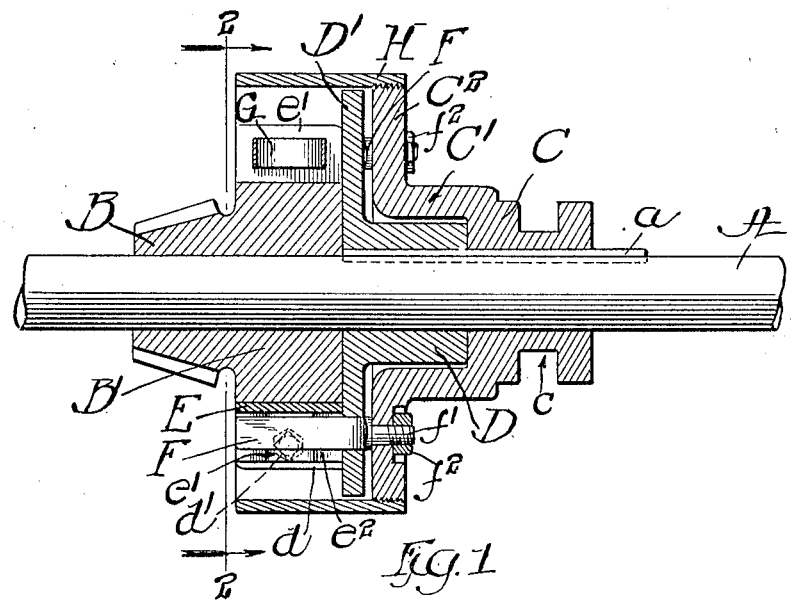
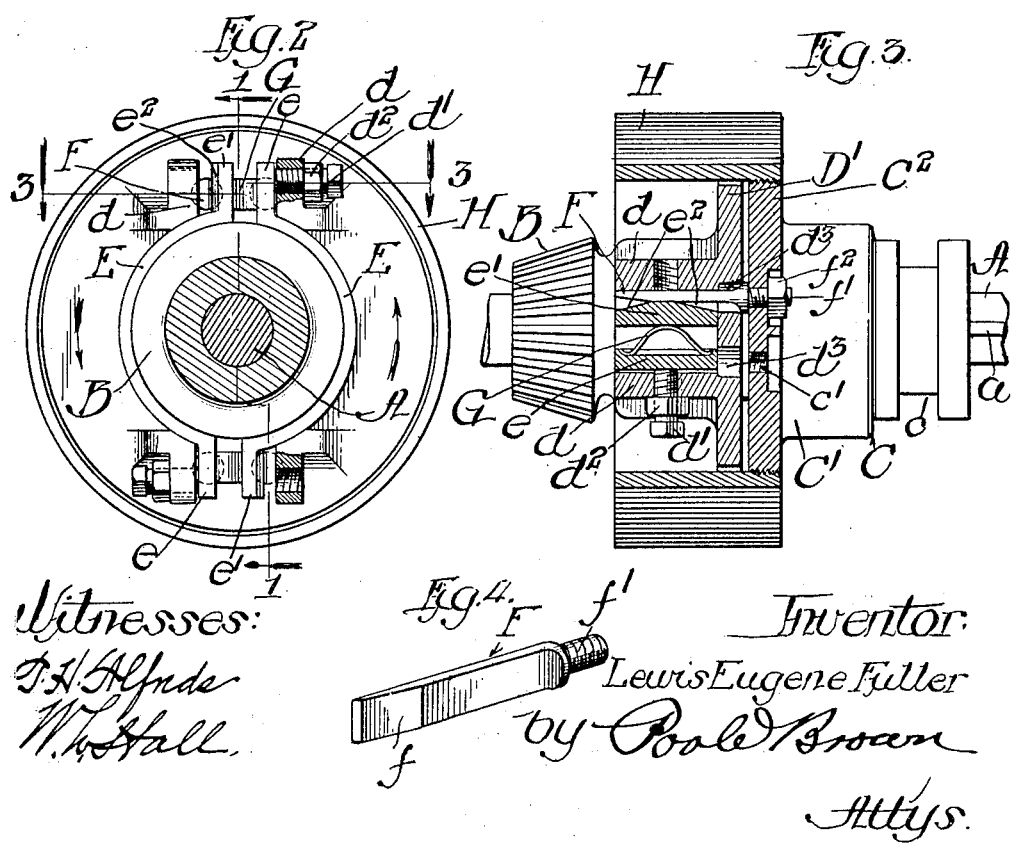
Witnesses:
Inventor:
Lewis Eugene Fuller
by Poole & Brown
Att'ys.

UNITED STATES PATENT OFFICE.

LEWIS EUGENE FULLER, OF CHICAGO, ILLINOIS, ASSIGNOR OF ONE-HALF TO ARTHUR M. HEATH, OF CHICAGO, ILLINOIS.

CLUTCH.

No. 888,078.  Specification of Letters Patent.  Patented May 19, 1908.

Application filed June 13, 1907. Serial No. 378,689.

*To all whom it may concern:*

Be it known that I, LEWIS EUGENE FULLER, a citizen of the United States, and a resident of Chicago, in the county of Cook and State of Illinois, have invented certain new and useful Improvements in Clutches; and I do hereby declare that the following is a full, clear, and exact description thereof, reference being had to the accompanying drawings, and to the letters of reference marked thereon, which form a part of this specification.

This invention relates to improvements in friction clutches for locking to a shaft or like rotative part a gear or other part which is normally loose on said shaft, and the invention consists in the matters hereinafter set forth and more particularly pointed out in the appended claims.

Among the objects of my invention is to provide an exceedingly simple and efficient clutch device for the purposes set forth, one of which is compact and has few relatively movable parts, and characterized by the absence of parts projecting from the clutch, as a whole.

In the drawings:—Figure 1 is a longitudinal, sectional view of a clutch embodying my invention, said view being taken on line 1—1 of Fig. 2. Fig. 2 is a section taken on line 2—2 of Fig. 1. Fig. 3 is a section taken on line 3—3 of Fig. 2. Fig. 4 is a perspective view of one of the actuating wedges of the clutch device.

As herein shown the clutch is designed to lock a stationary gear wheel to a rotative shaft, but it is obvious that it is as well adapted for locking a normally stationary shaft to a continuously rotating gear wheel or like part.

As shown in the drawings, A designates a rotative shaft, and B designates a gear wheel loosely mounted on said shaft and provided with a hub $B^1$ having an exteriorly cylindric friction surface.

C designates a collar that is mounted on the shaft to have longitudinal movement thereon, but is fixed non-rotative thereto by means of a feather or spline $a$. Said collar is provided with an annular groove $c$ to receive the usual fork of the clutch actuating device. Fixed to or formed integral with said collar is a casing $C^1$ that terminates in a radial circular flange $C^2$.

D designates a ring or collar which surrounds the shaft within the casing $C^1$ and is provided at one end with a radial circular flange $D^1$ parallel with the flange $C^1$. The said flanged ring D is endwise immovable of the shaft as well as non-rotative thereon, and may be thus fixed to the shaft by the feather or spline $a$.

E E designate the two members of a two-part clutch ring which surrounds the hub of the gear wheel B and is formed to provide an internal cylindric surface to engage the external cylindric surface of said hub. As herein shown, each of said ring members extends nearly half way around the gear wheel hub. Each of said ring members is provided at one end with a lug $e$ and at its other end with a lug $e^1$, and when said ring members are assembled in the clutch the lug $e$ of one ring member is adjacent to and parallel with the lug $e^1$ of the other ring member. The inner face of said flange $D^1$ is provided with laterally extending lugs $d\ d$ arranged in pairs, one pair at each side of the central axis of said flange. Each pair of lugs $e\ e^1$ of the ring members occupy the space between one pair of lugs $d\ d$. The said lugs $d$ are provided with screw-threaded apertures which receive two set screws $d^1$, one located at each side of a plane passing between the lugs of each pair and through the axis of the shaft, and said set screws bear at their inner ends against the lugs $e$ of said clutch ring members E. The said screws are locked in position by lock nuts $d^2$.

F F designate two clutch actuating wedges carried by the flange $C^2$ of the endwise movable collar C. Said wedges extend through openings $d^3$ in the flange $D^1$, and the ends of said wedges extend into the spaces between the lugs $e^1$ of the ring clutch members and the other lugs $d$ of the flange $D^1$. The said actuating wedges are provided at their advance ends with inclined or wedge faces $f$ which enter the space between the ring member lugs $e^1$ and the flange lugs referred to. The said clutch actuating wedges are provided at their outer ends with reduced screw-threaded shanks $f^1$ which extend through openings $c^1$ in the flange $C^2$ of the collar C and are fastened to said latter flange by nuts $f^2$. The lateral outer faces of the lugs $e^1$, adjacent to the companion lugs $d$, are inclined, as indicated at $e^2$ (Figs. 2 and 3) for engagement with the inclined or wedge faces $f$ of the actuating wedges, whereby when the wedges are thrust inwardly the ring members are pressed against the friction surface of the gear wheel hub to lock the shaft to said gear wheel. Separating springs G G are interposed between the lugs $e$ $e^1$ of said ring members to spread or force apart the clutch ring members when the wedges are withdrawn. Said springs are shown as curved leaf springs, the convex faces of which bear against one of the lugs $e$ $e^1$ of each pair and the inner faces of the other lugs ($e$ as herein shown) are recessed to provide seats for the ends of said springs G, (Fig. 3). The said clutch members E are made of such resiliency that when pressure is applied at the lugs $e^1$ by the wedges F to press the rings against the inclosed cylindric friction surface of the hub of the gear wheel, the said ring members will hug or closely embrace the surface of said hub throughout the entire lengths of said ring members, thereby affording uniform bearing between the frictionally engaged parts with a result of uniform wear throughout the lengths of the clutch ring members. As before stated, two of said lugs $d$ and the set screws $d^1$ constitute abutments against which the lugs $e$ of the ring members E bear and said abutments are adjustable by reason of the screw-threaded engagement of the set screws with the lugs $d$ so as to compensate for wear between the parts E and the part $B^1$.

The pressure to bring the ring members into clutching engagement with the exterior friction surface is applied to one end of each ring member through its associated wedge F. As before stated, the said stationary abutments are located on the opposite sides of a plane passing through the axis of the shaft A and between the lugs of the clutch ring members and similarly the two actuating wedges are located on opposite sides of said plane. The said stationary abutments are so located, relatively to the direction of rotation of the movable part of the clutch, that the outward thrust on each ring member E, due to the frictional engagement of the movable part of the clutch with the stationary part, when the said ring members are pressed together by the action of the wedges F, is transmitted principally to said stationary abutments through the lugs $e$ of said ring members. This arrangement avoids such pressure or thrust being transmitted from the lugs $e^1$ of said clutch ring members to the associated lugs $d$ as to objectionably resist the inward thrust of the actuating wedges between said lugs $e^1$ and associated lugs $d$. Assuming for example, that the shaft and parts carried thereby are rotated in the direction indicated by the arrow in Fig. 2, when the ring members are closed upon the hub $B^1$, the reactionary stress or thrust due to the starting of rotation of the gear wheel B under its load is transmitted through the lugs $e$ of the clutch ring members, while the pressure transmitted through the lug $e^1$ of said ring members is so small as to permit the actuating wedges to be readily thrust inwardly and with the use of less power, than if said stress or thrust were exerted on both ends of the clutch ring members alike.

The parts of the clutch are so constructed that the clutch may be operated with the same advantage regardless of whether or not the shaft A or the other continuously rotative part is rotating in one direction or the other. For this purpose all of said lugs $d$ of the flange $D^1$ are apertured to receive the set screws $d^1$ so that said set screws may be arranged in a reverse position from that shown in Fig. 2. Said flanges $D^1$ and $C^2$ are provided with another set of guiding and attaching openings whereby the actuating wedges may be adjusted to correspond with the changed position of the set screws $d^1$. Moreover, the lateral faces $e^2$ of the lugs $e^1$ are inclined in both directions from their centers, as clearly shown in Fig. 3. With this arrangement, when the set screws and wedges have been adjusted to changed positions, the clutch ring members E are removed from the hub and reversed so as to bring the inclined faces $e^2$ of the lugs $e^1$ opposite to the lugs $d$ which formerly carried the set screws $d^1$.

The principal parts of the clutch device may be inclosed by a guard ring H which is interiorly screw-threaded at one end to engage peripheral screw-threads on the flange $C^2$ of the collar C. The presence of the ring avoids the exposure of outwardly projecting rotating parts which are liable to come into contact with the clothing of persons standing near the clutch.

In the operation of the device the wedges are moved inwardly and outwardly by shifting the collar C longitudinally of the shaft by any well known shifting mechanism adaptable for the purpose. It will be observed that the flange $D^1$ constitutes what may be termed a driving flange through which power is transmitted from the shaft A to the hub $B^1$ of the gear wheel when the ring members are locked on said hub.

It will be understood that the structural details of the clutch may be considerably varied and I do not wish to be limited to such details except as hereinafter made the subject of specific claims.

I claim as my invention:—

1. In a friction clutch, the combination with a shaft and a part mounted to normally rotate freely thereon and provided with an external friction surface, of two semi-circular, resilient clutch members embracing said friction surface and provided at their ends with outwardly turned, integral lugs which are arranged in two pairs, two pairs of lugs carried by the shaft, each pair of clutch member lugs being located between and in line with the lugs of one pair carried by the shaft, and one of the clutch member lugs of each pair being anchored against an adjacent lug carried by the shaft, and clutch actuating wedges adapted to be thrust between the other lugs carried by the shaft and the outer faces of the adjacent clutch member lugs.

2. In a friction clutch, the combination with a shaft and a part mounted to normally rotate freely thereon and provided with an external friction surface, of two semi-circular, resilient clutch members embracing said friction surface and provided at their ends with outwardly turned lugs which are arranged in two pairs, two pairs of lugs carried by the shaft, each pair of clutch member lugs being located between and in line with the lugs of one pair carried by the shaft, and one of the clutch member lugs of each pair being anchored against an adjacent lug carried by the shaft, and clutch actuating wedges adapted to be thrust between the other lugs carried by the shaft and the outer faces of the adjacent clutch member lugs, said wedges being located on the opposite sides of a plane passing between said clutch members.

3. In a friction clutch, the combination with a shaft and a part mounted to normally rotate freely thereon and provided with a friction surface, of two clutch members arranged to engage said friction surface with their ends arranged in closely spaced pairs, a part carried by the shaft to which one end of each clutch member is anchored, clutch actuating devices also carried by the shaft and operating against the other ends of said clutch members to force said clutch members against said friction surface, the clutch actuating devices of each member being located opposite the anchor end of the other member and means whereby said clutch members may be reversed end to end and the clutch actuating devices being correspondingly reversible for the purpose set forth.

4. In a friction clutch, the combination with a shaft and a part mounted to normally rotate freely thereon and provided with an external friction surface, of two semi-circular clutch members arranged to embrace said friction surface with their ends arranged in closely spaced pairs, a part carried by the shaft to which one end of each clutch member is anchored, clutch actuating wedges also carried by the shaft and operating against the other ends of the clutch members to force said clutch members against said friction surface, the clutch actuating wedge of each member being located opposite the anchored end of the other member, and means whereby said clutch members may be reversed end to end and the clutch actuating wedges being correspondingly reversible, for the purpose set forth.

5. In a friction clutch, the combination with a shaft and a part mounted to normally rotate freely thereon and provided with an external friction surface, of two semi-circular clutch members embracing said friction surface and provided at their ends with outwardly turned lugs arranged in pairs, a disk fixed to the shaft, the lug at one end of each clutch member being anchored to said disk, a collar sliding on the shaft exterior to the disk, and wedges fixed rigidly to said collar and extending through apertures in the disk and acting against the other lugs of said clutch members to force said clutch members against said friction surface.

6. In a friction clutch, the combination with a shaft and a part mounted to normally rotate freely thereon and provided with an external friction surface, of two semi-circular clutch members embracing said friction surface and provided at their ends with outwardly turned lugs arranged in pairs, a disk fixed to the shaft, the lug at one end of each clutch member being anchored to said disk, a collar sliding on the shaft exterior to the disk, and wedges carried by said collar and extending through apertures in the disk and acting against the other lugs of said clutch members to force said clutch members against said friction surface, said clutch members being removably mounted so as to be reversible end to end, and the wedges being likewise removably mounted and reversible to correspond with the new location of the lugs of the clutch members.

7. In a friction clutch, the combination with a shaft and a part mounted to normally rotate freely thereon, and provided with an external friction surface, of two semi-circular clutch members embracing said friction surface and provided at their ends with outwardly turned lugs arranged in pairs, a disk fixed to the shaft, the lug at one end of each clutch member being anchored to said disk, a collar sliding on the shaft exterior to the disk, wedges fixed rigidly to said collar and extending through apertures in the disk and acting against the other lugs of said clutch members to force said clutch members against said friction surface, and a guard ring carried by said collar and surrounding said disk, clutch members and wedges.

8. In a friction clutch, the combination with a shaft and a part mounted to normally rotate freely thereon and provided with a wide external friction surface, of two semi-circular, resilient clutch members having wide faces which embrace said friction surface with a metal to metal contact, said clutch members being provided at their ends with outwardly turned, integral lugs which are arranged in two pairs, one of the lugs of each clutch member being anchored to a part stationary with the shaft, a collar movable longitudinally of the shaft and wedges rigid with said collar and adapted to be thrust between the outer faces of the other lugs of said clutch members and opposing parts also fixed to the shaft, said clutch actuating wedges being located on the opposite sides of a plane passing between said clutch members.

9. In a friction clutch, the combination with a shaft and a part mounted to normally rotate freely thereon and provided with an external friction surface, of a flange fixed to said shaft, a two-part clutch ring embracing said external friction surface, the ring members being provided at their ends with lugs, the lugs at the adjacent ends of said ring members being arranged in pairs, two pairs of lugs carried by said disk between the lugs of each pair of which is arranged one pair of ring member lugs, screws mounted in two of said disk lugs, against which the adjacent ring member lugs bear, and wedges adapted to be thrust between other ring member lugs and the adjacent disk lugs.

10. In a friction clutch, the combination with a shaft and a part mounted to normally rotate freely thereon and provided with an external friction surface, of a flange fixed to said shaft, a two-part ring embracing said external friction surface, the ring members being provided at their ends with lugs, the lugs at the adjacent ends of said ring members being arranged in pairs, two pairs of lugs carried by said disk between the lugs of each pair of which is arranged one pair of ring member lugs, screws mounted in two of said disk lugs against which the adjacent ring member lugs bear, and wedges adapted to be thrust between other ring member lugs and the adjacent disk lugs, said wedges being disposed on the opposite sides of a plane passing between said ring members.

In testimony, that I claim the foregoing as my invention I affix my signature in the presence of two witnesses, this 11th day of June A. D. 1907.

LEWIS EUGENE FULLER.

Witnesses:
WILLIAM L. HALL,
GEORGE R. WILKINS.